United States Patent [19]

Kondo et al.

[11] Patent Number: 4,975,492

[45] Date of Patent: Dec. 4, 1990

[54] BUTENE-1 COPOLYMER COMPOSITION

[75] Inventors: Masahiko Kondo; Takashi Yamawaki, both of Ichihara, Japan

[73] Assignees: Idemitsu Petrochemical Company Limited, Tokyo, Japan; Neste Oy, Keilaniemi, Finland

[21] Appl. No.: 218,392

[22] Filed: Jul. 13, 1988

[30] Foreign Application Priority Data

Jul. 14, 1987 [JP] Japan ................................. 62-175310

[51] Int. Cl.$^5$ ........................ C08L 23/04; C08L 23/10
[52] U.S. Cl. .................................... 525/240; 526/142; 526/348.6
[58] Field of Search ...................... 525/240; 526/348.6, 526/142

[56] References Cited

U.S. PATENT DOCUMENTS

| T955,099 | 2/1977 | Lansbury et al. | 428/515 |
|---|---|---|---|
| 3,634,552 | 1/1972 | Foglia et al. | 260/897 |
| 3,634,553 | 1/1972 | Foglia et al. | 260/897 |
| 3,836,607 | 9/1974 | Finkmann et al. | 260/897 |
| 4,230,767 | 10/1980 | Isaka et al. | 428/349 |
| 4,734,328 | 3/1988 | Kohyama et al. | 525/240 X |

FOREIGN PATENT DOCUMENTS

| 0135358 | 3/1985 | European Pat. Off. ......... 526/348.6 |
|---|---|---|
| 1694622 | 8/1971 | Fed. Rep. of Germany . |
| 2147999 | 3/1973 | France . |
| 2314212 | 1/1977 | France . |
| 2361225 | 3/1978 | France . |
| 60-38414 | 2/1985 | Japan . |
| 61-108615 | 5/1986 | Japan . |
| 61-108647 | 5/1986 | Japan . |
| 61-118449 | 6/1986 | Japan . |
| WO82/00826 | 3/1982 | PCT Int'l Appl. . |

Primary Examiner—Joseph L. Schofer
Assistant Examiner—F. M. Teskin
Attorney, Agent, or Firm—Armstrong, Nikaido, Marmelstein, Kubovcik & Murray

[57] ABSTRACT

The present invention relates to a butene-1 copolymer composition which has excellent heat sealing properties, mechanical characteristics, moldability, and transparency without lowering its surface characteristics, and is characterized by containing 75 to 99.5% by weight of a butene-1 copolymer comprising butene-1 unit and α-olefine having a carbon number of 2 to 3, and 25 to 0.5% by weight of a propylene polymer, the said butene-1 copolymer has an α-olefine unit content of 1 to 35 mol %, intrinsic viscosity of 0.9 to 7.2 dl/g, weight-average molecular weight/number-average molecular weight of 4 to 15, and the content of the boiling diethyl ether soluble component is 3 to 15% by weight of the copolymer.

4 Claims, No Drawings

BUTENE-1 COPOLYMER COMPOSITION

BACKGROUND OF THE INVENTION

(1) Field of the Invention

The present invention relates to a butene-1 copolymer composition, and in particular, to a butene-1 copolymer composition which has excellent heat sealing properties, mechanical characteristics, moldability, and transparency without lowering its surface characteristics.

(2) Description of the Related Art

In recent years, butene-1 copolymer has come to notice as a soft or semi-soft resin.

However, since butene-1 copolymer has a maximum melting point (DSC measurement) of 120° C., its heat sealing temperature is too high for it to be molded into a film, and it has problems such as practical use.

Therefore, a method is proposed for lowering the heat sealing temperature of the butene-1 copolymer (cf. Japanese Patent Application Laid-Open No. 108615/86, and Japanese Patent Application Laid-Open No. 38414/85). However, in order to lower the heat sealing temperature to a temperature that is sufficiently low for practical use, a considerably large amount of another α-olefine must be copolymerized. As a result, the film is likely to stick and block, thereby lowering the other properties the film must be provided with in order to make it suitable for practical use.

A composition is also known in which a large amount of propylene copolymer is mixed with butene-1 copolymer. (cf. Japanese Patent Application Laid-Open No. 108647/86 and Japanese Patent Application Laid-Open No. 118449/86 [U.S. Pat. No. 655397]).

However, the copolymers described in these official publications had the problem that the heat sealing temperature does not lower to sufficiently practical level, because so much propylene copolymer is mixed as to make the melting point of the propylene copolymer dominant.

SUMMARY OF THE INVENTION

The present invention has the object of providing a butene-1 copolymer composition in which the heat sealing temperature is lowered sufficiently for practical use. More particularly, an object of the present invention is to provide a butene-1 copolymer composition which has excellent heat sealing properties, surface characteristics, mechanical strength, moldability and transparency, without lowering its surface characteristics.

The construction of the present invention for attaining the object described above is such that the butene-1 copolymer composition is characterized in that it includes 75 to 99.5% by weight of butene-1 copolymer and 25 to 0.5% by weight of propylene copolymer consisting of butene-1 unit and α-olefine having 2 or 3 carbon numbers, wherein the α-olefine content is 1 to 35 mol %, intrinsic viscosity is in the range of 0.9 to 7.2 dl/g, weight—average molecular weight/number—average molecular weight is in the range of 4 to 15, and the content of the boiling diethyl ether soluble component in the copolymer is in the range of 3 to 45% by weight.

DESCRIPTION OF THE PREFERRED EMBODIMENT

The butene-1 copolymer of the present invention includes butene-1 units and α-olefine units having a carbon number of 2 to 3.

The above-described α-olefine units can be cited as ethylene units and propylene units.

The α-olefine units in the butene-1 copolymer may include simply one kind of either of the above-described ethylene unit or propylene unit, or may simultaneously include both ethylene units and propylene units. The preferable α-olefine unit is the propylene unit.

This butene-1 copolymer includes α-olefine units, or especially, propylene units and butene-1 units, normally at a mol ratio in the range of 1:99 to 35:65. When the inclusion mol ratio of the α-olefine, or especially, propylene unit is lower than 1, the lowering of the heat sealing temperature of the film becomes insufficient in case the butene-1 copolymer composition is molded into a film. In addition if the mol ratio of the α-olefine units, or especially, of the propylene units is larger than 35, then, in case the butene-1 copolymer composition is molded into a film, the surface of the film becomes sticky and the surface characteristics of the film deteriorate.

In particular, in the present invention, it is preferable to determine the above-described mol ratio in the range of 3:97 to 30:70. By keeping the mol ratio in this range, a butene-1 copolymer compound from which can be produced a molded film that is more homogeneous and has high transparency can be obtained.

The intrinsic viscosity [$\eta$] measured in a decalin solution at 135° C. of the butene-1 copolymer of the present invention is in the range of 0.9 to 7.2 dl/g. This extreme viscosity [$\eta$] has an influence mainly on the moldability and the mechanical strength of the butene-1 copolymer composition.

If intrinsic viscosity [$\eta$] is lower than 0.9 dl/g, then, in case the butene-1 copolymer composition is molded into a film, the mechanical strength, or especially, the anti-impact properties of the film lower. When it is higher than 7.2 dl/g, the moldability also lowers. In particular, in the present invention, by keeping the intrinsic viscosity [$\eta$] in the range of 1.0 to 4.0 dl/g, the mechanical characteristics of the butene-1 copolymer composition become very good and the moldability of the film is also improved.

The molecular weight distribution, that is, the ratio (Mw/Mn) of the weight-average molecular weight (Mw) and the number-average molecular weight (Mn) is in the range of 4 to 15.

This molecular weight distribution gives transparency to the molded body obtained, and simultaneously also influences the moldability and the mechanical strength of the molded body.

In the butene-1 copolymer obtained by the conventional method, the width of this molecular weight distribution has a tendency to become narrow, so that a molded body having sufficient moldability is difficult to obtain and moreover, in case it is molded into a film-like shape, the transparency of the film was generally insufficient.

That is, the butene-1 copolymer having the above-described molecular weight distribution, which does not reach 4, shows insufficient moldability for a film of butene-1 copolymer, and moreover, the transparency of the molded film deteriorates. When the above-described molecular weight distribution is wider than 15, the transparency of the film made of the butene-1 copolymer composition also becomes low.

In particular, in the present invention, it is preferred that the molecular weight distribution be in the range of 4 to 10. The butene-1 copolymer composition, which is in this range has good moldability and further, the mechanical characteristics and transparency of the film obtained by molding the butene-1 copolymer composition are especially good.

In the butene-1 copolymer compound, the amount of the component that is soluble in boiling diethyl ether is in the range of 3 to 45% by weight.

In general, solubility in boiling diethyl ether shows the tendency of decreasing further, the higher the degree of polymerization of the butene-1 copolymer becomes, and also has the tendency of decreasing further, when crystallinity increases. In the butene-1 copolymer in the present invention, the fact that the soluble amount into boiling diethyl ether is kept within the above-described range, restricts the amount of components with a low degree of polymerization and crystallinity in the butene-1 copolymer.

Therefore, when the amount of components soluble in boiling diethyl ether is less than 3% by weight, the transparency of the film-like molded body decreases, and when the amount is more than 45% by weight, sticking occurs, because the rate at which components with low degree of polymerization are included becomes high. By regulating the amount of components that are soluble into boiling dimethyl ether to be especially in the range of 4 to 35% by weight, the transparency of the molded body increases, and together with that, sticking etc. does not occur in the butene-1 copolymer, so that preferable results can be obtained.

As butene-1 copolymer of the present invention, the one that is preferable is that for which the blocking property (X) of the α-olefine units in this butene-1 copolymer measured by nuclear magnetic resonance spectrum analysis is in a specially defined range.

As to the blocking properties (X) of the α-olefine unit, the $^{13}$C-NMR of the butene-1 copolymer is measured, and each triad is identified with the results of the measurement utilizing the method described in "Macromolecules" 15, 353, (1982). Thus, the measurement of the blocking properties (X) of the α-olefine in the main chain of the butene-1 copolymer can be carried out from the following equation [1].

$$X = I/O \quad [1]$$

where, in the Eq. [1], I is the block polymerization ratio of the chain of the α-olefine unit in the butene-1 copolymer, and is normally represented by the following equation.

In case the α-olefine unit is a propylene unit, I can be represented by the following equation.

$$I = \frac{I_{PP}}{I_{PB}}$$

In addition, O in the above-described Eq. [1] is the percentage content of the α-olefine unit in the butene-1 copolymer. When he α-olefine unit is a propylene unit, O is the percentage content P of the propylene unit. The percentage of content P of the propylene unit is usually represented by the following equation.

$$P \text{ (mol \%)} = \frac{I_{PP} + I_{PB}/2}{I_{PP} + I_{PB} + I_{BB}} \times 100$$

But, in the above-described equation, $I_{pp}$ shows the peak strength of the sequence of the propylene chain of $I_{pppp} + I_{PPPB} + I_{BPPB}$, and $I_{PB}$ shows the peak strength of the sequence of the propylene-butene-1 chain of $I_{BPB-P} + I_{BPBB} + I_{PPBB}$, and $I_{BB}$ shows the peak strength of the sequence of the butene-1 chain of $I_{BBBB} + I_{PBB-B} + I_{PBBP}$.

When the butene-1 copolymer in the present invention is a copolymer of butene-1 and propylene, the blocking property (X) of the propylene unit in the butene-1 copolymer is less than 0.01. When the blocking property (X) of propylene is less than 0.01, the amount the heat seal temperature of the film made of butene-1 copolymer reduces can be made much larger.

In addition, in case the butene-1 copolymer is a copolymer of ethylene and butene-1, I in the above-described equation [1] is the block polymerization amount of the chain of the ethylene units in the butene-1 copolymer, this block polymerization ratio of the chain of ethylene units is usually represented by the following equation:

$$I = \frac{I_{EEE}}{I_{PBE} + I_{EBE} + I_{BEB}}$$

Moreover, O which defines the blocking property (X) of α-olefine is the percentage content E of the ethylene units in the butene-1 copolymer, when the α-olefine is ethylene. This percentage content of ethylene units is usually represented by the following equation:

$$E \text{ (mol \%)} = \frac{I_{EEE}/2 + I_{EBE} + I_{EEB}}{I_{BBB} + I_{BBE} + I_{BEB} + I_{EEE}/2 + I_{EBE} + I_{EEB}} \times 100$$

But, in the above-described equation, $I_{EEE}$ represents the existing mol number of the chain of ethylene unit-ethylene unit-ethylene unit in the butene-1 copolymer, and in the following, in the same way as above, $I_{BBE}$, $I_{EBE}$, and $I_{BEB}$ also, show the unit in case the three monomer units in the copolymer are noticed and taken as one unit.

The blocking property (X) of the ethylene unit in the butene-1 copolymer in the present invention should be less than 0.015. This value is also preferable when it is lower, so that the most preferable value is zero. When the blocking property (X) of the ethylene unit is less than 0.015, the lowering of the heat sealing property of the butene-1 copolymer film can be made much larger.

Incidently, identification can be carried out by measuring the strength of the methylene peak appearing in the region of 48 to 39 ppm obtained in the measurement of 13C-NMR by utilizing the literature of J. Polym, Sci. Phys. Fd. 21,573, (1983).

The butene-1 copolymer of the present invention can be readily produced using, for example, as a catalyst, a solid catalyst component obtained from a magnesium compound shown by the general formula

or $$Mg(OR^1)_m X_n$$

(where $R_1$ and $R^2$ is the formula are alkyl groups having carbon numbers of 1 to 20, and may be the same or different, and m satisfies $0 \leq m \leq 2$, and $n0 \leq n \leq 2$.), an organic aluminium compound and a specified electron donor compound, to make α-olefines, e.g. propylene and/or ethylene and butene-1 react in the gas phase.

Concretely, in the production technology described in the specifications of the Japanese Patent Application Nos. 144093/86, 196265/86, 196266/86 and 196722/86, by establishing the production conditions experimentally with the above-described characteristics of the copolymer of the present invention as a yard stick, the butene-1 copolymer can be produced.

In the following, an explanation is given of the method for producing the butene copolymer of the present invention along the method described in the Specification of the Japanese Patent Application No. 196266/86, but, the butene-1 copolymer of the present invention is not restricted by this production method.

The copolymer of the present invention can be readily produced in the presence of a catalyst comprising the solid catalytic component (A) described in the following, an organic aluminium compound (B), and an electron donor compound (C), by making butene-1 and propylene react under gas phase polymerization conditions.

The solid catalytic component (A) is prepared by chlorinating at least one kind of organic magnesium compound shown as $$MgR^1R^2$$

(in the formula, $R^1$ and $R^2$ may be the same or different, and represent respectively an alkyl group with carbon number of 1 to 20.) with at least one kind of chlorinating agent to obtain a carrier. The carrier is then put in contact with a halide of tetravalent titanium in the presence of an electron donor at a temperature in the range of $-25°$ to $+180°$ C. Thus, the catalyst is obtained.

The organic magnesium compound can be such alkyl magnesium compounds as diethyl magnesium, ethylbutyl magnesium, ethylhexyl magnesium, ethyloxyl magnesium, dibutyl magnesium, butylhexyl magnesium, butyloctyl magnesium, and dicyclohexyl magnesium.

Among these, butyloctyl magnesium is preferable.

The chlorinating agent can be chlorine gas and alkyl chloride, and in the present invention, the combined use of chlorine gas and butyl chloride is preferred.

Chlorination is normally carried out at 0° to 100° C. (preferably, at 20° to 60° C., and 20° to 40° C. is particularly preferable).

By this chlorination, some of the alkyl groups bound to magnesium atom are displaced with chlorine atoms. Moreover, since at least a part of the alkyl groups remain, formation of normal crystal lattice is prevented, so that a non-layered matter with a very small crystal diameter having an appropriate surface area and hole volume is formed.

The non-layered matter thus formed is subjected to alcohol treatment, if required, and subsequently, the non-layered matter is treated with a halide of tetravalent titanium in the presence of an electron donor. Treatment with the halide of tetravalent titanium is normally effected at a temperature within the range of $-25°$ to $+180°$ C.

The above-described halide of tetravalent titanium can be titanium tetrahalide, titanium alkoxy-trihalide, titanium alkoxydihalide, and titanium trialkoxy-monohalide. In the present invention, the use of titanium tetrachloride is particularly preferable.

The electron donor can be oxygen, nitrogen, phosphorous, or organic compounds including sulphur.

Concrete examples of this electron donor are amines, amides, ketones, nitriles, phosphines, phosphoramides, ethers, thioethers, thioesters, acid anhydrides, acid halides, acid amides, aldehydes, organic acids, and esters. Those preferred are esters, ethers, ketones, acid anhydrides etc.

Concrete examples of these compounds are ethyl benzoate, p-methoxy ethyl benzoate, p-ethoxy ethyl benzoate, methyl toluilate, di-isobutyl phthalate, benzoquinone, anhydrous benzoic acid, ethyleneglycol butyl ether, etc. Among these di-isobutyl phthalate is preferable.

For the solid catalytic component (A) thus prepared, the preferred halogen/titanium mol ratio is 3 to 200 (the particularly preferable ratio is 4 to 100), and preferred magnesium/titanium mol ratio is 1 to 90 (particularly preferable one is 5 to 70).

There are no restrictions on the above-described organic aluminium compound (B), but trialkyl aluminium is particularly preferred.

As the electron donor compound (C), the use of heterocyclic compounds represented by the following formula (2) is preferable.

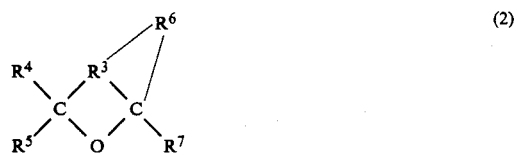

(But, in the formula, $R^3$ and $R^6$ denote hydrocarbon groups, or preferably, substituted or non-substituted, saturated or non-saturated hydrocarbon group having a carbon number 2 to 5, and $R^4$, $R^5$, and $R^7$ denote hydrogen or hydrocarbon groups, or preferably, hydrogen or substituted or non-substituted, saturated or non-saturated hydrocarbon groups, having a carbon number 1 to 5 respectively.)

As the heterocyclic compounds, can be cited for example, 1,4-cineole, 1,8-cineole, m-cineole, binole, benzofran, 2,3 hydrobenzofran (cumaron), 2H-curomen, 4H-curomen, curoman, iso-curoman, dibenzofran, xanthin, etc. Of these several kinds of heterocyclic compounds one kind may be used alone, or two kinds may be combined.

Among the above-described various kinds of heterocyclic compounds, 1,8-cineole is particularly preferable.

The composition of the catalyst used for producing the butene-1 copolymers of the present invention is made in such a way that the organic aluminium compound (B) is normally in the range of 0.1 to 1,000 times mol (preferably, 1 to 500 times mol) for the titanium atoms in the tetravalent titanium compound in the solid catalytic component (A). In addition the electron donor compound (C) is normally used in the range of 0.1 to 500 times mol (preferably, 0.5 to 200 times mol) for the titanium atoms in the tetravalent titanium compound in the solid catalytic component (A).

The gas phase polymerization temperature is normally 45° to 80° C. (preferably, at 50° to 70° C.).

The polymerization pressure can be set appropriately in a range where the substantial liquefaction of material components does not occur. In normal circumstances, the pressure is set at 1 to 15 kg/cm$^2$.

The introductory mol ratio of propylene and butene-1 can be set appropriately in the range of both members in the copolymer to be obtained, that is in the range of 1:99 to 35:65 (preferably, in the range of 1:99 to 30:70).

For the purpose of regulating molecular weight, a molecular weight regulating agent such as hydrogen may be present. Moreover, for the purpose of preventing coagulation, an inert gas having a lower boiling point than that of butene-1 (e.g., nitrogen, methane, ethane, and propane) can be combined.

The butene-1 copolymer of the present invention thus obtained is mixed with propylene copolymer at a specified ratio to form a butene-1 copolymer composition.

The above-described propylene copolymer can be propylene homopolymer, propylene random copolymer which includes other α-olefine unit at a ratio of not greater than 20 mol % (preferably, 2 to 15 mol %), the so-called propylene block copolymer made by two-step polymerization, and a mixture of the above-described propylene sole copolymer and the above-described propylene copolymer.

For the α-olefine which becomes the above-described α-olefine unit in the above-described propylene copolymer, α-olefine having a carbon number of 2 to 10 is preferable, and in particular, α-olefine having carbon number of 2 to 5 is preferable. Such α-olefines can be cited, for example, as ethylene, butene-1, pentene-1, hexene-1, 4-methyl pentene-1, octene-1, nonene-1 and decene-1.

On the other hand, the preferable propylene copolymer is the one in which its intrinsic viscosity [$\eta$] measured in a decaline solution at a temperature of 135° C. is in the range of 1.0 to 3.0 dl/g.

When the intrinsic viscosity [$\eta$] is in the above-described range, a more homogeneous composition can be obtained, and a bad external appearance such as the occurrence of eruptions in the case of film formation can be avoided. Thus, the composition is preferable.

The mixing ratio of the butene-1 copolymer and the propylene copolymer is such that the butene-1 copolymer is 75 to 99.5% by weight (preferably, 78 to 99.0% by weight) and the propylene copolymer is 25 to 0.5% by weight (preferably, 22 to 1.0% by weight).

When the mixing ratio of the propylene copolymer exceeds 25% by weight, the melting point of the propylene copolymer becomes predominant and the heat sealing temperature of the film made of butene-1 copolymer composition does not lower sufficiently, so the characteristics of butene-1 copolymer composition due to the butene-1 copolymer deteriorate. In addition, when the mixing ratio of the propylene copolymer is less than 0.5% by weight, the heat sealing temperature of the film made of butene-1 copolymer composition does not lower.

The mixing of butene-1 copolymer and the propylene copolymer can be effected by a usual mixing method such as the dry blend method, and various kinds of mixers, kneaders and extruders can be used.

The butene-1 copolymer composition according to this invention can be used for various kinds of molded bodies, and is particularly appropriate as a material for film molding.

The butene-1 copolymer composition of the present invention is made by mixing a specified butene-1 copolymer and a limited amount of propylene copolymer. Therefore, when this butene-1 copolymer composition is molded to form a film, the heat sealing temperature of the film can reduced, without bringing about a deterioration of the surface characteristics such as the antiblocking properties.

This butene-1 copolymer composition also has good moldability, and a film with good mechanical characteristics and transparency can be molded.

Next, examples and comparative examples of the present invention are shown.

(EMBODIMENT 1)

(1) Preparation of Said Catalytic Component (A)

Three hundred ml of butyloctyl magnesium 20%. heptane solution were put in a five-mouthed flask equipped with a mechanical stirrer, a reflux condenser, a dropping funnel, a gas supply valve, and a thermometer, and nitrogen was introduced into the flask to maintain an inert atmosphere in the flask. Then, 5 ml of butyl chloride was added into the flask at room temperature using the dropping funnel. Subsequently, chlorine gas was added at a rate of 5 ml/min. to start chlorination.

Next, at 25° to 35° C., 2.51 l of silicone oil was added, and further, 113 ml of ethanol was added dropwise into this mixture. The chlorinated matter formed was precipitated by the addition of ethanol. The mixed solution including this precipitate was stirred for one hour at 40° C. and subsequently the temperature was raised to between 75° and 80° C., and the solution was left stand at this temperature over-night.

This high temperature solution was added gently to a solution cooled to −25° C. and including di-isobutyl phthalate (electron donor) and the excess TiCl$_4$ by means of a siphon, to precipitate the reaction's intermediate product in this low temperature TiCl$_4$. Then, the mixed solution including this precipitate was heated to room temperature.

Next, to the mixed solution including this precipitate was further added di-isobutyl phthalate as an electron donor, and the temperature was raised to 100° to 110° C., and the mixed solution was kept at this temperature for one hour. The reaction product was precipitated, and washed 5 to 6 times with pentane at 85° C. The solution was transferred to another vessel by means of a siphon.

Furthermore, excess TiCl$_4$ was added to this solution, and the mixture was stirred at 110° C. for one hour. After separating the precipitate that formed and the solution with the siphon, the catalytic component that formed (precipitate) was washed with heptane several times (5 to 6 times at 80° C.).

The precipitate obtained was assembled an dried under a weak reduced pressure. Thus, the solid catalytic component (A) with Ti content of 3.0% by weight could be obtained.

(2) Preparation of Catalyst

The solid catalytic component obtained in the above-described paragraph (1) was put into a catalyst preparation tank to make the titanium concentration become 2 millimol per 1 litre. Into this catalyst preparation tank was put 30 millimol/l of triisobutyl aluminium and 12 millimol/l of 1,8-cineole. Subsequently, propylene was put in at such a proportion to become 50 g per 1 millimol of titanium atom; then, the temperature in the catalyst preparation tank was raised to 40° C. to carry out the reaction for preparing the catalyst. After continuing the reaction for one hour, the reacted solution was filtered, and an activated catalyst was obtained.

(3) Production of Butene-1 Copolymer

A fluidized bed gas phase polymerizer with a diameter of 300 mm and volume of 100 l was used. The activated catalyst powder obtained in the above-described paragraph (2) was supplied from the catalyst supply tank to the above-described polimerizer at a rate of 0.1 millimol of Ti atom conversion per 10 minute in batches.

Triisobutyl aluminium was also supplied at a flow rate of 30 millimol/hour, and 1,8-cineole at a flow rate of 24 millimol/hour, respectively, to the above-described polymerizer.

Monomer mixed gas (butene-1: propylene=90:10), nitrogen gas, and hydrogen gas were supplied respectively in such a manner that the partial pressure of the monomer mixed gas is 3 $Kg/cm^2$, the partial pressure of nitrogen gas is 4 $Kg/cm^2$, and the partial pressure of hydrogen gas is 0.11 $Kg/cm^2$. Gas was circulated to let the gas empty tower speed reach the speed of 35 cm/sec., and polymerization was effected at a reaction temperature of 55° C. The polymer formed was extracted in 10-minute batches.

(4) Production of Butene-1 Copolymer Composition

After sufficiently mixing 85 weight part of the butene-1 copolymer obtained in the above-described paragraph (3), 15 weight part of propylene copolymer (propylene sole copolymer, intrinsic viscosity [$\eta$] of 2.0 dl/g) and 0.3 weight part of additive (calcium stearate 1000 ppm, 2,6-di-t-butyl-4-methyl phenol 1000 ppm, oxidation inhibitor (trade name: Iruganox 1010) 1000 ppm), the mixture was pelletized by an extruder with a two-axis kneader to obtain pellets of butene-1 copolymer composition.

These pellets were further molded into a film of 30 μm thickness by a T diecast molding machine having a screw of 20 mm diameter. The heat seal temperature and the blocking strength of the film were measured.

The results are shown in Table 1.

(EXAMPLES 2 TO 9 AND COMPARATIVE EXAMPLES 1 TO 6)

In Examples 2 and 3 and in Comparative Examples 1 and 2, production was carried out in the same manner as in the above-described Example 1, except that, in the production of the butene-1 copolymer composition as described in (4), the mixing ratio of the butene-1 copolymer and the propylene copolymer was changed as shown in Table 1.

In Comparative Example 3, except for the use of the butene-1 copolymer having the composition shown in Table 1 and obtained by changing the composition of the mixed gas of butene-1 and propylene in the production of the butene-1 copolymer as above-described in (3), production was carried out in the same manner as in Embodiment 1.

In Comparative Example 4, except that, in the above-described (2) Preparation of the catalyst and the above-described (3) Production of butene-1 copolymer, respectively, the description was changed from "1,8-cineole 12 millimol/l, 1,8-cineole 24 millimol/hour", to "di-methoxy-di-phenyl silane 4 millimol/l, di-methoxy-di-phenyl silane 4 millimol/hour", and in the above-described (4) Production of butene-1 copolymer composition, the mixing ratio of the butene-1 copolymer and the propylene copolymer was changed as shown in Table 1, the experiment was carried out in the same manner as in Example 1.

In Comparative Example 5, except for the use of the butene-1 copolymer having the composition as shown in Table 1 and obtained in the above-described (3) Production of butene-1 copolymer, by making the partial pressure of hydrogen gas 0.03 $Kg/cm^2$ and changing the mixed gas composition of butene-1 and propylene, and effecting the supply of propylene in 30-minute batches, and also, in the above-described (4) Production of butene-1 copolymer composition, the mixing ratio of the butene-1 copolymer and propylene copolymer was as shown in Table 1, production was carried out in the same way as in Example 1.

In Comparative Example 6, except for the use of butene-1 copolymer having the composition shown in Table 1 and obtained, in the above-described (3) Production of butene-1 copolymer, by stopping the supply of 1,8-cineole, making the partial pressure of hydrogen 0.11 Kg/cm, and changing the mixed gas composition of the butene-1 and propylene, production was carried out in the same way as in Example 1.

In Example 4, except that the propylene copolymer was changed to propylene-ethylene random copolymer (ethylene content 5.0 mol %, intrinsic viscosity [$\eta$] 1.7 dl/g) in the production of above-described (4) butene-1 copolymer, production was carried out in the same way as in Example 1.

In Example 5, in the production of the above-described (4) butone-1 copolymer composition, except that the propylene copolymer was changed to propylene-ethylene block copolymer (first stage; propylene sole polymerization, second stage; ethylene-propylene random copolymerization, ethylene content 12 mol %, extreme viscosity [$\eta$] 1.6 dl/g) and the mixing ratio of the butene-1 copolymer and the propylene-ethylene block copolymer was as shown in Table 1, production was carried out in the same manner as in Example 1.

In Embodiment 6, except for the use of the butene-1 copolymer having the composition shown in Table 1 and obtained by making the partial pressure of hydrogen 0.03 $Kg/cm_2$, and changing the composition of the mixed gas of the butene-1 and propylene in the above-described (3) Production of butene-1 copolymer, production was carried out in the same manner as in Example 1.

In Example 7, except for the use of the butene-1 copolymer having the composition shown in Table 1 and obtained by making the partial pressure of hydrogen 0.08 $Kg/cm^2$ and changing the composition of the mixed gas of butene-1 and propylene, production was carried out in the same manner as in Example 1.

In Example 8, except for the use of the butene-1 copolymer having the composition shown in Table 1 and obtained by changing the composition of the mixed gas of butene-1 and ethylene as butene-1/ethylene=98/2 in the above-described (3) Production of butene-1 copolymer, and the mixing ratio of the butene-1 copolymer and the propylene polymer is the value shown in Table 1, production was carried out in the same manner as in Example 1.

In Example 9, except for the use of the butene-1 copolymer having the composition shown in Table 1 and obtained by effecting the supply of ethylene in 20- minute batches in the above-described (3) Production of butene-1 copolymer, and the mixing ratio of the butene-1 copolymer and the propylene polymer is just the value shown in Table 1, production was carried out in the same manner as in the above-described Example 8.

The results of respective Examples and Comparative Examples are shown in Table 1.

METHODS OF MEASUREMENT

Items measured listed in Table 1 are as follows:
Intrinsic Viscosity [$\eta$]

The intrinsic viscosity was measured in decaline at the temperature of 135° C.
Molecular Weight Distribution (Mw/Mn)

The molecular weight distribution was measured by installing two pieces of Showdex AD807 and AD80M/S, respectively, on the GPC apparatus 150 C made by Waters Co., Ltd. The temperature for measurement is 135° C.
Trial of the $\alpha$-Olefine Unit The $^{13}$C nuclear magnetic resonance spectrum of the butene-1 copolymer obtained was measured, and each triad was identified from the results by utilizing the method described in the previously described "Macromolecules". The calculation was effected by the following equation in the manner described previously.

$$X = I/O$$

Amount of Boiled Diethyl Ether Soluble Portion

After drying the butene-1 copolymer obtained, Soxhlet was extracted with diethyl ether for 6 hours to obtain the amount of the soluble portion.
Heat Sealing Temperature The copolymer pellets obtained were molded into a film with thickness of 30 $\mu$m et a pulling speed of 7 m/min. using a T diecast molder with a screw diameter of 20 mm.

The sheets of this film were loaded by a heat sealer with a weight of 2 Kg/cm$^2$ at a predetermined temperature to be pressed for one second. The sample obtained having a width of 15 mm was subjected to a peeling test at a peeling rate of 20 mm/min and a peeling angle of 180°. The temperature at which the peeling resistance force reached 300 g was taken as a heat sealing temperature.
Anti-blocking Property The evaluation of the antiblocking property was effected according to ASTM D3354. Molded film with a thickness of 30 $\mu$m was cut to form sheets 5 cm width and 25 cm length. The smooth surfaces of the sheets were overlapped, and weight of 36 g/cm$^2$ was loaded and left to stand in a thermostat. After 3 hours, the sample was taken out, and after leaving it to stand at room temperature for 30 minutes, the peeling strength was measured with a universal test apparatus to obtain the peeling strength per 100 cm$^2$ as the blocking value.

TABLE 1

| | (A) butene-1 copolymer | | | | | | (B) propylene polymer | |
|---|---|---|---|---|---|---|---|---|
| | $\alpha$-olefine unit | | [$\eta$] | | amount of soluble matter | | kind | [$\eta$] |
| | kind | mol % | dl/g | Mw/Mn | wt % | x | homogeneous | dl/g |
| Ex. 1 | propylene | 15.2 | 1.9 | 5.8 | 14.3 | 0.0055 | homogeneous | 2.0 |
| Ex. 2 | propylene | 15.2 | 1.9 | 5.8 | 14.3 | 0.0055 | homogeneous | 2.0 |
| Ex. 3 | propylene | 15.2 | 1.9 | 5.8 | 14.3 | 0.0055 | homogeneous | 2.0 |
| Co. Ex. 1 | propylene | 15.2 | 1.9 | 5.8 | 14.3 | 0.0055 | homogeneous | 2.0 |
| Co. Ex. 2 | propylene | 15.2 | 1.9 | 5.8 | 14.3 | 0.0055 | homogeneous | 2.0 |
| Co. Ex. 3 | propylene | 41.1 | 2.2 | 5.6 | 57 | 0.0122 | homogeneous | 2.0 |
| Co. Ex. 4 | propylene | 13.3 | 1.4 | 3.4 | 10.9 | 0.0061 | homogeneous | 2.0 |
| Co. Ex. 5 | propylene | 0.7 | 3.5 | 5.6 | 2.4 | 0.0041 | homogeneous | 2.0 |
| Co. Ex. 6 | propylene | 24.7 | 2.0 | 6.0 | 51 | 0.0048 | homogeneous | 2.0 |
| Ex. 4 | propylene | 15.2 | 1.9 | 5.8 | 14.3 | 0.0055 | random | 1.7 |
| Ex. 5 | propylene | 15.2 | 1.9 | 5.8 | 14.3 | 0.0055 | block | 1.6 |
| Ex. 6 | propylene | 25.7 | 3.7 | 6.4 | 38.3 | 0.0089 | homogeneous | 2.0 |
| Ex. 7 | propylene | 1.9 | 2.5 | 6.0 | 4.8 | 0.0018 | homogeneous | 2.0 |
| Ex. 8 | ethylene | 4.5 | 1.9 | 5.2 | 15.9 | 0.0068 | homogeneous | 2.0 |
| Co. Ex. 7 | ethylene | 5.1 | 2.2 | 5.3 | 11.1 | 0.0178 | homogeneous | 2.0 |

| | mixing ratio (A)/(B) weight ratio | DSC melting point °C. | heat sealing temperature °C. | anti-blocking characteristics g/100 cm$^2$ |
|---|---|---|---|---|
| Ex. 1 | 85/15 | 76 | 78 | 40 |
| Ex. 2 | 95/5 | 78 | 81 | 45 |
| Ex. 3 | 90/10 | 76 | 77 | 43 |
| Co. Ex. 1 | 70/30 | 160 | 101 | 41 |
| Co. Ex. 2 | 99.8/0.2 | 106 | 109 | 67 |
| Co. Ex. 3 | 85/15 | 61 | 62 | 112 |
| Co. Ex. 4 | 90/10 | 80 | 82 | 55 |
| Co. Ex. 5 | 90/10 | 117 | 116 | 41 |
| Co. Ex. 6 | 85/15 | 69 | 67 | 102 |
| Ex. 4 | 85/15 | 78 | 80 | 40 |
| Ex. 5 | 95/5 | 78 | 81 | 41 |
| Ex. 6 | 85/15 | 67 | 70 | 50 |
| Ex. 7 | 85/15 | 98 | 96 | 29 |
| Ex. 8 | 78/22 | 74 | 78 | 44 |
| Co. Ex. 7 | 90/10 | 95 | 108 | 38 |

What is claimed is:
1. A composition containing 75 to 99.5% by weight of a butene-1 copolymer and 25 to 0.5% by weight of a propylene polymer, said butene-1 copolymer containing 1 to 35 mol % of propylene and having an intrinsic viscosity of 0.9 to 7.2 dl/g, a weight-average molecular weight/number-average molecular weight of 4 to 15, and 3 to 45% by weight of boiling diethyl ether solubles, wherein the blocking property of the propylene in the butene-1 copolymer is 0.01 or less.

2. A composition according to claim 1, wherein the propylene polymer has an intrinsic viscosity of 1.0 to 3.0 dl/g as measured in decalin at 135° C.

3. A composition containing 75 to 99.5% by weight of a butene-1 copolymer and 25 to 0.5% by weight of a propylene polymer, said butene-1 copolymer containing 1 to 35 mol % of ethylene and having an intrinsic viscosity of 0.9 to 7.2 dl/g, a weight-average molecular weight/number-average molecular weight of 4 to 15, and 3 to 45% by weight of boiling diethyl ether solubles, wherein the blocking property of the ethylene in the butene-1 copolymer is 0.015 or less.

4. A composition according to claim 3, wherein the propylene polymer has an intrinsic viscosity of 1.0 to 3.0 dl/g as measured in decalin at 135° C.

* * * * *